United States Patent [19]

Crivello et al.

[11] Patent Number: 4,895,967

[45] Date of Patent: Jan. 23, 1990

[54] METHOD FOR MAKING CYCLIC POLY(SILOXANE)S

[75] Inventors: James V. Crivello, Clifton Park; Julia L. Lee, Schenectady, both of N.Y.

[73] Assignee: General Electric Company, Schenectady, N.Y.

[21] Appl. No.: 248,658

[22] Filed: Sep. 26, 1988

[51] Int. Cl.[4] .............................................. C07F 7/08
[52] U.S. Cl. .................................... 556/451; 556/460
[58] Field of Search ................................ 556/460, 451

[56] References Cited

U.S. PATENT DOCUMENTS

| 2,934,550 | 4/1960 | Jack | 556/460 |
|---|---|---|---|
| 3,607,898 | 9/1971 | Macher | 556/460 |
| 3,714,213 | 1/1973 | Miller et al. | 556/460 X |
| 4,111,973 | 9/1978 | Bluestein | 556/460 |
| 4,276,425 | 6/1981 | Burkhardt et al. | 556/460 |
| 4,764,631 | 8/1988 | Halm et al. | 556/460 X |

FOREIGN PATENT DOCUMENTS

| 624330 | 7/1961 | Canada | 556/460 |
|---|---|---|---|
| 0126792 | 12/1984 | European Pat. Off. | 556/460 |
| 875046 | 7/1949 | Fed. Rep. of Germany | 556/460 |
| 2363539 | 7/1974 | Fed. Rep. of Germany | 556/460 |
| 950305 | 10/1946 | France | 556/460 |
| 50-1455394 | 12/1975 | Japan . | |

OTHER PUBLICATIONS

*Cyclic Dimethyl Siloxanes,* "Organo-Silicon Polymers. The Cyclic Dimethyl Siloxanes", Hunter et al., (1946) pp. 667-672, (vol. 68).

*Journal of Organometallic Chemistry,* 238 (1982), "Metal Complex-Catalzed Redistribution Reactions of Organosilanes", Gustavson et al., pp. 87-97.

"Cyclic Polysiloxanes from the Hydrolysis of Dichlorosilane", Seyferth et al., (1982) American Chemical Society.

*Primary Examiner*—Paul F. Shaver
*Attorney, Agent, or Firm*—William A. Teoli; James C. Davis, Jr.; William H. Pittman

[57] ABSTRACT

A method is provided for making cyclic poly(siloxane) by incrementally contacting linear polysilxoane with a fixed bed cracking catalyst, such as an acidic Zeolite under reduced pressure. The resulting volatile cyclic poly(siloxane) is then recovered.

10 Claims, 1 Drawing Sheet

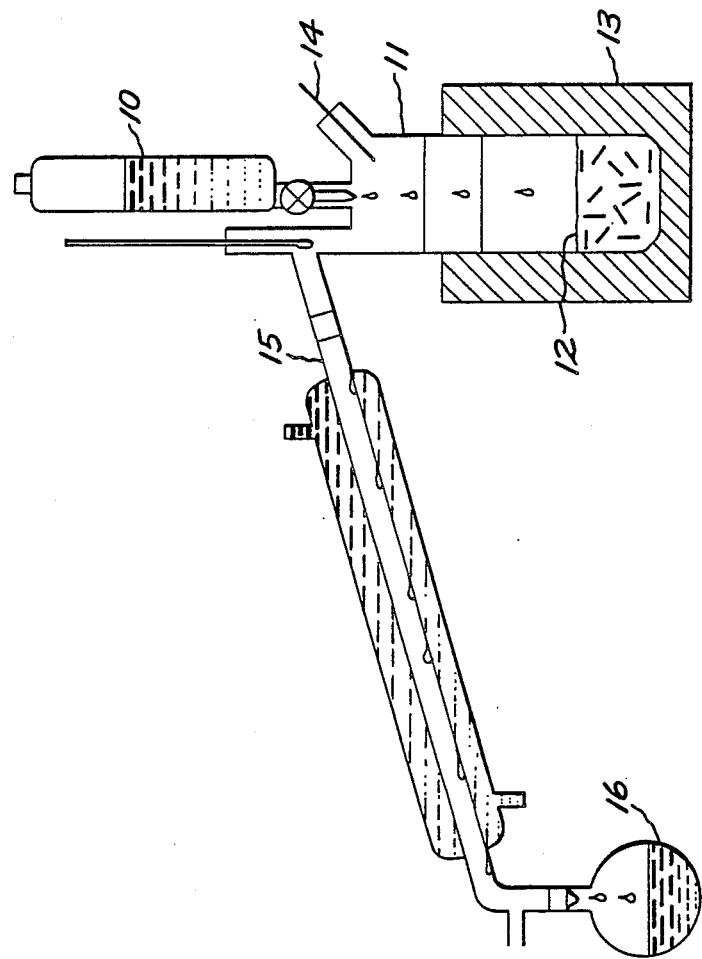

METHOD FOR MAKING CYCLIC POLY(SILOXANE)S

BACKGROUND OF THE INVENTION

Prior to the present invention, cyclic poly(siloxane)s were generally made by hydrolyzing diorgano dihalosilanes which resulted in a mixture of cyclic poly(diorganosiloxane)s and linear poly(diorganosiloxane)s. The proportion of cyclic poly(siloxane)s to linear oligomers can be optimized by careful choice of the solvent and conditions of the hydrolysis. Although the hydrolysis method has been the preferred procedure for preparing cyclic poly(dimethylsiloxane), it has been found less suitable for the synthesis of poly(methylhydrogensiloxane).

The preparation of cyclic poly(dimethylsiloxane)s by the thermolysis of poly(dimethylsiloxane)s in the presence of sodium hydroxide has been described by Hunter et al., *Journal of the American Chemical Society*, 68, 667, 1946. Additional methods for making cyclic poly(dimethylsiloxane)s from poly(dimethylsiloxane) is shown by Gustavson et al., *Journal of Organometallic Chemistry*. 238, 87 (1982) utilizing a transition metal complex, such as a rhodium or iridium-containing complex.

A further method for making cyclic poly(siloxane)s including cyclic poly(siloxane)s having hydrogen functionality is shown by U.S. Pat. No. 3,714,213, Miller et al. which employs an acid treated clay. Although Miller et al.'s method has been found to provide hydrogen containing cyclic poly(siloxane)s at satisfactory yields, it allows for the presence of large amounts of hydrogen-functional poly(siloxane) at high temperature during the formation of the cyclic poly(siloxane). This reduces the likelihood that the Miller et al. procedure can be commercially scaled up because a considerable risk of explosion is present. Another procedure for making cyclic hydrogen functional poly(siloxane)s is shown by Endo, Japan Kokai AP 52/69500, June 9, 1977; CA Vol. 87, 1977, page 28: 118455b. The Endo procedure is also dangerous, as it allows for the build up of large amounts of linear poly(methylhydrogensiloxane) at elevated temperatures. Halm et al., U.S. Pat. No. 4,764,631, provides a procedure for reforming cyclic poly(siloxane)s utilizing an alkali metal compound. This method would be unsuitable for making cyclic poly(methylhydrogen siloxane), as it requires an alkali metal compound.

It would be desirable, therefore, to provide a safe procedure for making cyclic poly(siloxane)s having chemically combined diorganosiloxy units, or organohydrogen siloxy units, and mixtures thereof which could be commercially scaled up without any danger of explosion. In addition, it also would be desirable to make homopolymers or copolymers of diorganosiloxy units and organohydrogen siloxy units in cyclic form at satisfactory yields in a simple and direct manner.

The present invention is based on the discovery that if substantially linear organosiloxane, including silicone materials having organohydrogen siloxy units is added dropwise onto a heated fixed catalyst bed, there is produced volatile cyclic poly(organosiloxane) upon contact. It has been further found that if the vaporous cyclic poly(organosiloxane) is immediately condensed at a point remote from the catalyst bed, build-up of vaporous cyclic poly(organosiloxane) in contact with such hot surface can be avoided.

STATEMENT OF THE INVENTION

There is provided by the present invention a method for making cyclic poly(siloxane) which comprises,
(1) incrementally contacting substantially linear poly(organosiloxane) to a fixed catalyst bed at a temperature in the range of 200° C. to 800° C. and a pressure of from ambient to 0.01 torr in an oxygen-free atmosphere to produce volatile cyclic poly(siloxane), and
(2) condensing at a point remote from such fixed catalyst bed and thereafter recovering the cyclic poly(siloxane) from (1), where the substantially linear organopoly(siloxane) consists essentially of from 3 to 20, and preferably 3 to 10 chemically combined organosiloxy units selected from the class consisting of diorganosiloxy units, organohydrogen siloxy units and a mixture thereof.

The substantially linear poly(organosiloxane) which can be used in the practice of the present invention to make cyclic poly(organosiloxane) can be made by hydrolyzing or cohydrolyzing organohalosilanes, such as dimethyldichlorosilane or methylhydrogen dichlorosilane. Although methylhydrogen dichlorosilane or a mixture thereof with dimethyl dichlorosilane is preferred, similar results can be obtained by employing other chlorosilanes, such as diethyldichlorosilane, methylphenyldichlorosilane and other organohalosilanes, where the organo radical can be selected from $C_{(1-8)}$ alkyl radicals, such as methyl, ethyl, propyl, butyl, pentyl, aryl radicals such as phenyl, halophenyl, tolyl and xylyl, and radicals such as trifluoroethyl and cyanoethyl.

In instances where cyclic poly(organosiloxane)s are desired consisting essentially of diorganosiloxy units and organohydrogensiloxy units, it has been found that optimum results can be achieved if the linear poly(organosiloxane) used in contacting the fixed catalyst bed is in the form of a substantially linear copolymer consisting essentially of diorganosiloxy units and organohydrogensiloxy units. It has been found that such substantially linear copolymers can be made by equilibrating a mixture of the respective homopolymers, such as homopolymers of chemically combined diorganosiloxy units and homopolymers of chemically combined organohydrogensiloxy units, with or without chain stopper units such as trimethylsiloxy units.

Effective copolymer formation results can be achieved by equilibrating a mixture of the respective homopolymers at a temperature in the range of from 25° C. to 150° C. using an acidic catalyst, such as trifluoromethanesulfonic acid. Equilibration time can be from 1 to 24 hours.

Fixed bed catalysts which can be used to cyclize the substantially linear organosiloxane in accordance with the practice of the invention are, for example, acid-treated bentonite clays, such as Filtrol-20 of the Filtrol Company of Cleveland, Ohio, molecular sieves modified by the addition of mineral acids such as sulfuric acid, and acidic Zeolite-type molecular sieves which can vary in pore size from 5 angstroms to 20 angstroms.

Reference is made to the drawing showing a schematic view of one form of apparatus which can be utilized in the practice of the present invention. There is shown more particularly at 10, a pressure equalizing addition funnel containing substantially linear poly(organosiloxane) which is allowed to drip onto the fixed bed catalyst at 12 through a quartz reaction vessel at 11.

A heater at 13 effects the vaporization of the resulting cyclic poly(siloxane) which is condensed at 15 and collected in a flask at 16. There is shown at 14 a nitrogen capillary to maintain an oxygen-free atmosphere. Other inert gases, such as noble gases, for example, argon, also can be used.

In order that those skilled in the art will be better able to practice the present invention, the following examples are given by way of illustration and not by way of limitation. All parts are by weight.

EXAMPLE 1

There was added dropwise, 20 ml. of a poly(methylhydrogensiloxane) consisting essentially of chemically combined methylhydrogensiloxy units and having terminal trimethylsiloxy units and a viscosity of about 100 centipoise at 25° C. to 10 grams of Filtrol-20, which is a bentonite clay treated with sulfuric acid and heated in a nitrogen atmosphere to a temperature of 400°-500° C. During the addition, a pressure of about 40 torr was maintained. Volatiles were generated which were condensed and collected. Examination of the product using a Hewlett-Packard 5840A-chromatograph equipped with 6'×⅛" OV101 silicone columns showed that the product consisted of four major components; namely, the corresponding trimethylcyclotrisiloxane, tetramethylcyclotetrasiloxane, pentamethylcyclopentasiloxane, and hexamethylcyclohexasiloxane in a ratio of 1:4:3:1. There was obtained a yield of about 85% by weight of cyclicpoly(siloxane) based on the weight of the original weight of poly(methylhydrogensiloxane).

EXAMPLE 2

There was added dropwise, 56 grams of a poly(methylhydrogensiloxane) fluid similar to Example 1 to 40 grams of type 5 angstrom molecular sieve (⅛" pellets) from the Alpha-Ventron Company of Danvers, Mass. Prior to the addition, the molecular sieve pellets had been treated with 2 ml. of concentrated sulfuric acid and then heated for 5 minutes at 400°-500° C. The addition was conducted in a nitrogen atmosphere at a pressure of about 20 torr. After an addition period of about 30 minutes, there was obtained 35.5 grams of distillate. The distillate consisted of a mixture of cyclic poly(methylhydrogensiloxane)s, with major amounts of trimethylcyclotrisiloxane, tetramethylcyclotetrasiloxane, pentamethylcyclopentamethylsiloxane and hexamethylcyclohexasiloxane in a ratio of 1:2:2:1.

An additional 51 grams of the poly(methylhydrogensiloxane) fluid was further reacted following the same procedure with the same catalyst heated to a temperature of 400°-500° C. There was collected an additional 36 grams of the above-mixed cyclics.

EXAMPLE 3

Linde molecular sieves (LZ-Y82) 1/16" diameter×⅛"×¼", surface area 625 square meters/g obtained from Alpha Ventron Company were calcined at 500° C. for 2 hours. There was added dropwise 41 grams of a poly(methylhydrogensiloxane) fluid consisting essentially of chemically combined methylhydrogensiloxy units having a viscosity of about 100 centipoise and terminal trimethylsiloxy units under a vacuum of about 40 millimeters. There was collected 29.5 grams of distillate. Based on method of preparation and use of a gas chromatograph, the product was cyclic poly(methylhydrogensiloxane) in the form of a mixture ranging from trimethylcyclotrisiloxane to octamethylcyclooctasiloxane.

The above procedure was repeated except that the fixed molecular sieve bed was heated to 500° C. and an additional 120.5 grams of the poly(methylhydrogensiloxane) fluid was added. There was obtained an additional 103 grams of the above-mixture of cyclics.

EXAMPLE 4

The procedure of Example 3 was repeated, except that there was added 25 grams of a poly(dimethylsiloxane) fluid having a viscosity of 100 centipoise at 25° C. and terminal trimethylsiloxy units to Linde LZ-Y82 molecular sieves heated to 400°-500° C. under a pressure of 40 torr. There was obtained 14 grams of cyclic poly(dimethylsiloxane) consisting primarily of hexamethylcyclotrisiloxane and octamethylcyclotetrasiloxane in a ratio of 3:1.

EXAMPLE 5

There was added dropwise 42 grams of a copolymer consisting of 30-35 mole percent of methylhydrogensiloxy units chemically combined with 65-70 mole percent of dimethylsiloxy units and terminated with trimethylsiloxy units having a viscosity of 60 centipoise at 25° C. to 20 grams of calcined Linde LZ-Y82 molecular sieve heated to 600° C. in an apparatus similar to the drawing. Rapid distillation of a mixture of cyclic products occurred under 40 torr. There was collected 35.6 grams of distillate. Examination of the product by gas chromatography showed that there was obtained a mixture of cyclic poly(siloxanes) consisting essentially of chemically combined dimethylsiloxy units and methylhydrogensiloxy units.

EXAMPLE 6

A mixture of 44.4 grams of a poly(dimethylsiloxane) fluid having a viscosity of 50 centipoise and terminal trimethylsiloxy units and 36 grams of a poly(methylhydrogensiloxane) fluid having a viscosity of 100 centipoise and consisting essentially of chemically combined methylhydrogensiloxy units and terminal trimethylsiloxy units was stirred at 100°-115° C. for 1½ hours in the presence of 1.5 grams of trifluoromethanesulfonic acid. There was then added to the mixture, 3 grams of magnesium oxide and the reaction mixture was stirred for 15 minutes to neutralize the acid. The mixture was then filtered under vacuum through a fritted funnel to obtain the equilibrated 50:50 copolymer.

There was added 62 grams of the above copolymer to Linde LZ-Y82 molecular sieves at a temperature of 600° C. using an apparatus similar to the drawing. There was obtained a 94% yield (51.8 grams) of a complex mixture of cyclic products after the distillate from the reaction mixture was selected. The resulting product was found to be a complex mixture of cyclic products consisting principally of 6- and 8-membered rings containing chemically combined dimethylsiloxy units and methylhydrogensiloxy units within the same rings based on method of preparation and gas chromatographic analysis.

It was further found that when a mixture of 14.8 grams of poly(dimethylsiloxane) fluid and 12 grams of a poly(methylhydrogensiloxane) fluid were introduced as a mixture dropwise onto a heated fixed bed of hot acid-treated molecular sieve, the resulting distillate showed that only products consisting of cyclic poly(siloxane)s derived from the poly(methylhydrogensiloxane) were obtained. Products were found from poly(dimethylsiloxane) and no mixed cyclics derived from both polymers were obtained. Examination of the reaction vessel showed that almost the entire amount of poly(dimethylsiloxane) remained as an unreacted oil.

EXAMPLE 7

A mixture of 29.6 grams of a poly(dimethylsiloxane) (0.4 equivalent segmer units) and 72 grams of a poly(methylhydrogensiloxane) (1.2 equivalent segmer units) was heated at 110°–115° C. for 1.5 hours in the presence of 2 grams of trifluoromethanesulfonic acid. There was then added 5 grams of magnesium oxide to the mixture which was stirred for 15 minutes to neutralize the acid. The mixture was then filtered through a sintered glass filter to remove the magnesium salt. There was obtained 86 grams of a transparent clear oil consisting of a copolymer containing randomly distributed dimethylsiloxy units and methylhydrogensiloxy units in a ratio of 1:3. There was obtained 62 grams of a mixture of cyclic poly(siloxane)s consisting of chemically combined dimethylsiloxy units and methylhydrogensiloxy units utilizing the method of Example 6.

EXAMPLE 8

A mixture of 13.5 grams (0.23 equivalents of SiH groups) of the mixture of hydrogen functional cyclic poly(siloxane) prepared in Example 3, 29 grams (0.24 mole) of 3-vinyl-7-oxabicyclo[4.1.0]heptane (vinylcyclohexene monooxide), 100 ml. of toluene was azeotropically dried using a calcium hydride drying trap for 1.5 hours. There was then added to the mixture 2 drops of a chloroplatinic acid-ethyleneglycol complex and the reaction mixture was heated at 50°–55° C. for 3 hours. The reaction mixture was then heated for 2 additional hours at 90°–95° C. An infrared spectrum of the mixture showed no trace of SiH absorption at 2100 cm$^{-1}$. The reaction mixture was allowed to cool and toluene and the remaining traces of unreacted epoxide were removed by heating for several hours at about 80° C. under 0.01 torr. There was obtained, 99.5 grams of a cyclic silicone epoxy monomer.

A mixture of the cyclic silicone epoxy monomer and 1% of (4-octyloxyphenyl)phenyliodonium hexafluoroantimonate was spread as a 1 mil film onto a glass plate. A tack-free film was obtained after a 1 second irradiation under a GE H3T77 medium pressure arc lamp.

Although the above examples are directed to only a few of the very many variables which can be employed in the practice of the present invention, it should be understood that the present invention is directed to uses of a much broader variety of substantially linear poly(organosiloxane) consisting essentially of diorganosiloxy units, organohydrogensiloxy units or chemically combined mixtures thereof on various fixed catalyst beds, as shown in the description preceding these examples.

What is claimed is:

1. A method for making cyclic poly(siloxane) which comprises,
   (1) incrementally contacting substantially linear poly(organosiloxane) to a fixed catalyst bed at a temperature in the range of 200° C. to 800° C. and a pressure of from 760 to 0.01 torr in an oxygen-free atmosphere to produce volatile cyclic poly(siloxane), and
   (2) condensing and thereafter recovering the volatile cyclic poly(siloxane) from (1), where the substantially linear poly(organosiloxane) consists essentially of from 3 to 20, chemically combined organosiloxy units selected from the class consisting of diorganosiloxy units, organohydrogen siloxy units and a mixture thereof.

2. A method for making cyclic poly(siloxane) in accordance with claim 1, where the linear poly(organosiloxane) consists essentially of chemically combined diorganosiloxy units.

3. A method in accordance with claim 2, where the substantially linear poly(organosiloxane) is poly(dimethylsiloxane).

4. A method in accordance with claim , where the substantially linear poly(organosiloxane) consists essentially of chemically combined organohydrogensiloxy units.

5. A method in accordance with claim 4, where the linear poly(organosiloxane) is a methylhydrogen polysiloxane.

6. A method in accordance with claim 1, where the fixed catalyst bed is an acidic Zeolite bed.

7. A method in accordance with claim 1, where the fixed catalyst bed is a molecular sieve modified by a mineral acid.

8. A method in accordance with claim 1, where the linear poly(organosiloxane) is a copolymer of diorganosiloxy units and organohydrogensiloxy units.

9. A method in accordance with claim 8, where the copolymer consists essentially of chemically combined dimethylsiloxy units and methylhydrogensiloxy units.

10. A method in accordance with claim 1, where the pressure is from 0.1 torr to 40 torr.

* * * * *